| United States Patent Office | 3,170,022
Patented Feb. 16, 1965 |
|---|---|

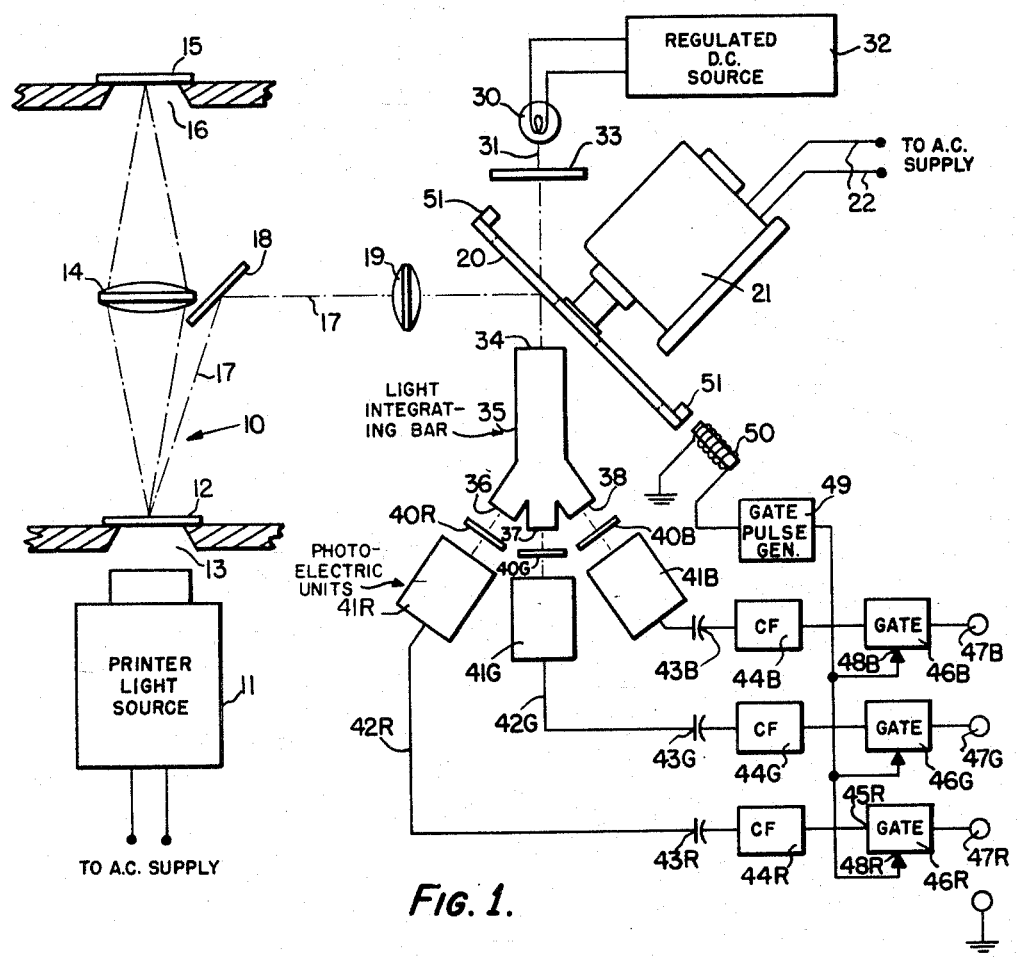
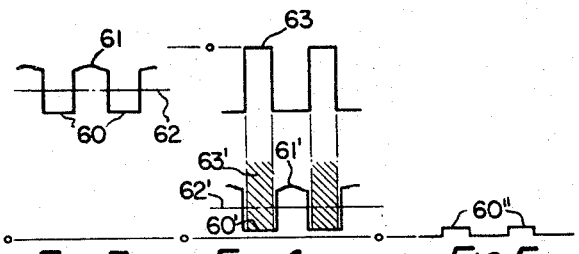
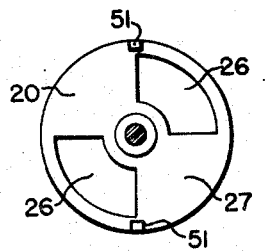
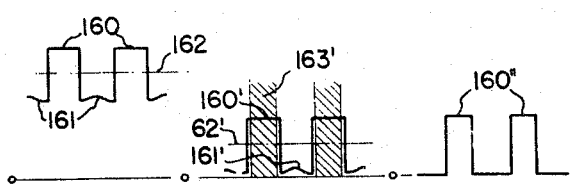

3,170,022
ELECTRO-OPTICAL PHOTOMETER
Jorgen Reesen, Rochester, N.Y., assignor to Eastman Kodak Company, Rochester, N.Y., a corporation of New Jersey
Filed Mar. 27, 1961, Ser. No. 98,398
8 Claims. (Cl. 88—14)

This invention relates to an electro-optical photometer particularly useful in conjunction with the control of a photographic color printer, and which produces three output voltages which vary linearly with the average or integrated optical density of a negative to be printed for each of the three primary color components, red, green and blue. While, of course, such a photometer could be utilized for many purposes, it is particularly well adapted for use with an exposure control system such as that shown and described in the companion application Serial No. 98,461, now Patent No. 3,120,782 having common assignee filed by Goddard and Huboi and entitled "Exposure Control System for Color Printing."

In color printing, it has been found that best results are normally obtainable when the exposure for any particular color component is controlled in accordance with the over-all or integrated densities of the negative to be printed for all three primary colors. It is therefore an object of this invention to provide a photometer which will furnish such density information and which, at the same time, is readily adaptable for use in any conventional color printer.

It is a further object of this invention to provide such a photometer which furnishes an output voltage, corresponding to each primary color, and the value of which varies linearly with the average density of the negative for that particular color component.

It is a still further object of this invention to provide such a photometer which utilizes the light from the normal printing source and yet which will provide extremely accurate results despite the fluctuations in intensity which inherently occur when the printing light source is energized by a conventional alternating current.

Further objects will become apparent from the following description and claims particularly when considered in the light of the accompanying drawings wherein: FIG. 1 is a diagrammatic view of my improved photometer.

FIG. 2 is a view of the light commutating means or light chopper used in my photometer.

FIGURES 3 through 8 are graphs showing the voltages which obtain at various points in the circuitry during operation of the photometer.

For purposes of explanation, I have shown my improved photometer associated with a conventional photographic printer 10 which is merely diagrammatically illustrated. This printer 10 includes a conventional light source 11 which is adapted to illuminate a negative 12 located at a negative station 13 with "white" light which includes the three primary color components red, green and blue in the proper proportion for color printing. An image of the illuminated negative 12 is formed by the printer optics 14 on a sensitized sheet 15 positioned at a printing station 16.

In order to obtain the color density information required to produce the desired results, some of the light from the negative 12 is directed, as indicated at 17, by a suitable mirror 18 toward a lens 19 which forms a small image of the negative substantially in the plane of a rotary chopper or light-commutating means 20. As best shown in FIG. 2 chopper 20 is in the form of a disk which is driven at constant speed by a suitable motor 21 adapted to be energized from the conventional A.C. supply lines 22. Preferably, for the reasons to be explained hereafter, motor 21 will operate at a synchronous speed of 1800 r.p.m. or some submultiple thereof. Chopper disk 20 is provided with two opposed openings 26, each of which preferably constitutes a substantially 90-degree sector. The remaining portions 27 of the disk between these openings 26, are provided with a light reflecting surface so that, when these reflecting portions 27 are in the path of the beam 17, the light therefrom will be reflected onto the input face 34 of an integrating bar 35, positioned adjacent the chopper.

A reference lamp 30 is also arranged adjacent the commutator disk 20 so as to direct light, as indicated at 31, toward the rear face of the disk 20 so that, when one of the openings 26 sweeps past the beam 31 the light from the reference source 30 will be permitted to pass to the input face 34 of the integrating bar 35. The arrangement is such that, as disk 20 rotates, the integrating bar 35 will alternately and cyclically receive light from the illuminated negative 12 being measured and then from the reference lamp 30. Lamp 30 is preferably energized from a source 32 of regulated D.C. voltage so that its intensity may be held constant. If necessary, a suitable filter or filters 33 may be interposed in the beam from the reference lamp 30 so as to bring the intensity and/or proportions of the color components in such beam to a desired value.

Integrating bar 35 is provided with three output facets 36, 37 and 38, one corresponding to each of the three primary color components. Associated with each output facet is a color filter designated for the appropriate color, red, green or blue, and which are respectively 40R, 40G, and 40B. As is obvious from the drawing all three color channels are identical and so, in the following description, only the red channel will pe described in detail. Arranged so as to respond to light passing the light filter 40R is a logging-type of photoelectric unit 41R which is adapted to produce at its output 42R a voltage which varies linearly with the logarithm of the intensity of the light falling upon the unit. Such units are well known in the art and may conveniently be of the type shown and described in Gunderson U.S. Patent No. 2,413,706. The output from the photo-electric unit 41R is then coupled by means of a capacitor 43R into a cathode follower 44R where the average level of the signal is brought to a predetermined value. The output from cathode follower 44R is then applied to the signal input terminal 45R of an electronic gate 46R, the output of which is applied to the RED output terminal 47R of the photometer unit.

Gate 46R is arranged to be alternately rendered conducting and non-conducting in timed synchronism with the rotation of the commutator disk 20. To this end, gating control pulses are applied to the gate control terminal 48R of the gate 46R, these gating control pulses being produced by a suitable pulse generator 49, which may conveniently be a monostable multivibrator of conventional construction triggered by a synchronizing pulse produced by a magnetic sensing element 50 responsive to magnetic elements 51 carried on the periphery of the disk 20. The gating pulses generated by pulse generator 49 are so synchronized with the rotation of the disk 20 and the pulse length is so proportioned that the gates 46R, G, and B in the various color channels will be opened or made conductive only during those periods when the light reaching the integrating bar 35 and photoelectric sensing units 41R, G, and B is derived from the reference lamp 30. As best shown in FIG. 2 the disk 20 is preferably arranged so that the two reflecting sectors 27 are of substantially the same angular extent as the two open sections 26 so that the photocell units will be responsive for substantially equal amounts of time to the light from the negative and that from the reference lamp 30.

Operation of the unit as above described will be more readily understood by reference to the graphs shown in FIGURES 3 through 8. Thus FIG. 3 shows the rectangular wave form of the output voltage from one of the photoelectric units, for example unit 41R, during operation of the photometer when the red density of the negative 12 at the negative station 13 is relatively high. In this case, during those portions of each cycle when the light reaching the photocell unit 41R is obtained from the negative 12, the output voltage will be relatively high as indicated at 61. During the alternate half cycles, when the photocell unit is responsive to the light from reference lamp 30, the output voltage from the photoelectric unit 41R will be at the level as indicated at 60. The average level of this fluctuating voltage pattern is indicated at 62. When this voltage is coupled through capacitor 43R to the cathode follower 44R the average level or axis 62' of the signal appearing at the output of cathode follower 44R will have been shifted to a new predetermined level, as indicated at FIG. 4, this new level being set by appropriate selection of the operating voltages and component values used in the cathode follower. The wave form of the signal will however not be materially altered and the higher potential portions 61' will still correspond to the signal derived from the negative while the lower level or reference portions 60' will correspond to the signal derived from the reference lamp 30. Directly above this wave form in FIG. 4, I have shown the gating pulses generated by pulse generator 49, drawn to a different zero-reference level but to the same time scale. It will be noted that these pulses, indicated at 63, are timed so that they occur only during those periods when the reference portions of the signal voltage is appearing at the output of the cathode follower 44R. In fact, preferably, (as indicated by the shading in FIG. 4) pulses 63 are of slightly shorter duration than the portions 60' of the signal voltage, so that any transients which might occur during the transition periods will not appear in the gated output voltage. Thus the voltage appearing at the output terminal 47R under the high color density conditions illustrated in FIGURES 3 and 4 will be as shown in FIG. 5 at 60°.

Consider now a case where the negative at the printing station 13 has a relatively low red density. The voltages appearing at the output of the sensing unit 41R might well be as is illustrated in FIG. 6. Portions 160 of this wave form represent the reference level (which, it will be noted, is the same as the portions 60 in FIG. 3) while the negative density level will be indicated by the portions 161. In this case, the generally "square wave" output from the sensing unit 41R is effectively reversed in phase from that shown in FIG. 3, the negative-density-derived portions of the signal and the average signal level 162 being lower than the reference portions. Once again the cathode follower 44R will shift the signal so that its axis 162 will coincide with the predetermined level indicated at 62'. As indicated by the shaded portions 163' in FIG. 7, the gating pulses once again permit only the reference portions 160' of the signal to pass through to the output terminal 47R so that the signal appearing at the output terminal will now be as indicated in FIG. 8. Note that in this case the peak value represented by the portions 160" is considerably higher than the corresponding portions 60" in FIG. 5. It can readily be seen that, with the arrangement as shown and described, the peak voltage at the output terminal will vary as a straight line function of the density although in the opposite sense; that is, when the negative density is greatest the output voltage will be lowest, and vice versa.

Because of the fact that the voltage appearing at the output terminal is directly derived from the reference lamp 30 (although its level will be affected by the density of the negative) many inaccuracies to which other density-determining arrangements of known construction are subject, are effectively eliminated. It is obviously possible to control the intensity of the illumination from this source 30 very accurately so that the output voltage will be quite stable. Moreover the arrangement is such that the output voltage is obtained only during those periods when the openings 26 in disk 20 are opposite the face 34 of the integrating bar 35 so that any imperfections in this disk, such as variations in reflectivity, will not directly appear in the output signal. By driving motor 21 at the proper synchronous speed (preferably 1800 r.p.m., in the case of a 60 cycle supply line and a 2-bladed chopper disk 20 such as is illustrated) the fact that the printer light source may have intensity fluctuations therein due to operation from a 60 cycle A.C. supply, will not adversely affect the operation. In fact, in FIGURES 3, 4, 6 and 7 I have indicated irregularities in the signal portions 61, 161, etc., derived from the negative, such as might occur due to such fluctuations in intensity of the printing light. With a 60 cycle supply these fluctuations would normally be substantially sinusoidal in nature and would occur at a frequency of 120 cycles per second. With the 2-bladed chopper disk 20 rotating at 1800 r.p.m. (or a submultiple thereof such as 900 r.p.m.) there would be one or more full waves of this variation superimposed on the average level during these periods as indicated in these figures. Since such sine waves are symmetrical about their own axes they would have no effect upon the average output level, and the axis 62 of the signal would remain exactly at the same level regardless of their presence or their absence.

While I have shown and described a photometer which is particularly intended for use in conjunction with operation of a color printer, it is obvious that a photometer of the same general construction and principle of operation could be used for many other purposes. It is, of course, not necessary that there be three separate channels; any desired number of channels could be used depending upon the number of frequencies or wave lengths at which it was desired to obtain density information. Obviously, too, other types of light commutating means, integrating means, electronic analyzing means or other components could be used without departing from the spirit and scope of the invention as defined by the appended claims.

I claim:

1. A photometer for indicating the average optical density of a transparency to light of a predetermined color, comprising a first source of light of such color for trans-illuminating the transparency, a reference light source, said reference light source emitting light of substantially constant intensity, electro-optical means responsive to light impinging thereon to produce an output voltage having a predetermined relationship to the intensity of the light impinging thereon, light control means for cyclically rendering said electro-optical means alternately responsive to diffuse light from said first source as modified by said transilluminated negative and from said reference source to produce an output signal therefrom, means for shifting the average level of the output signal from said electro-optical means to a predetermined reference value, an output terminal, and signal gating means operating in timed synchronism with said control means for applying said shifted signal to said output terminal only during those alternate periods when the light impinging on said electro-optical means is derived from said reference source.

2. A photometer as in claim 1 wherein said light control means includes a movable chopper having alternately arranged light-reflecting and light-transmitting portions, said chopper being so positioned relative to said light sources and to said electro-optical means that upon movement of said chopper it will alternately reflect light derived from said first source or directly pass light from said reference source toward said electro-optical means, and means for so moving said chopper.

3. A photometer for measuring the average optical density of a photographic transparency to light of predetermined characteristics, comprising a measuring station, a light source for transilluminating a transparency positioned at said station with light of said characteristics, a source of reference light of fixed intensity, a light integrator having an input and an output, and means including light commutating means for alternately directing light from said first source and which has passed through the transparency being measured and light from said reference source to the input of said integrator, logging photoelectric means responsive to the integrated light appearing at the output of said integrator for producing an output signal the amplitude of which at any instant corresponds to the logarithm of the intensity of said integrated light at that instant, signal normalizing means responsive to the output signal from said photo-electric means for bringing the average level of said output signal to a predetermined D.C. level, an output terminal, and signal gating means controlled in synchronism with the operation of said commutating means for passing said normalized output signal to said output terminal only during those periods when the light falling on said integrator is derived from said reference source.

4. A photometer for indicating the optical density of a transparency to light of predetermined color comprising first and second spaced sources of light of such color, the light output of said second source being of substantially constant intensity, means for directing light from said sources respectively along first and second paths having a common point of intersection, means for positioning a transparency to be measured in said first path ahead of such intersection, electro-optical means responsive to light impinging thereon to produce an output voltage having a predetermined relationship to the intensity of light impinging thereon, light commutating means positioned at said point of intersection and cyclically operative to alternately cause light travelling along each of said paths to impinge upon said electro-optical means to produce an output signal therefrom, means for shifting the average level of said output signal to a predetermined reference value, an output terminal, and signal gating means operating in timed synchronism with said light commutating means for applying said shifted signal to said output terminal only during those alternate periods when the light impinging upon said electro-optical means is derived from said second source.

5. A photometer as in claim 4, including a light diffusing element interposed between said commutating means and said electro-optical means.

6. A photometer for indicating the optical density of a transparency to light of each of a plurality of colors, comprising first and second spaced sources of light including a component corresponding to each of said colors, the light output of said second source being of substantially constant intensity, electro-optical means responsive to light impinging thereon to produce a plurality of output voltages, one for each of said colors, and each of said output voltages having a predetermined relationship to the intensity of the corresponding color component in the light impinging thereon, means including light commutating means for cyclically rendering said electro-optical means alternately responsive to light derived from the first of said sources as modified by a transparency to be measured and light derived directly from the second of said sources whereby said electro-optical means will produce an individual output signal corresponding to each said color component, means for shifting the average level of each of said output signals to a predetermined reference level, an output terminal corresponding to each of said color components, and gating means operative in timed synchronism with said light commutating means for passing said shifted output signals to the corresponding output terminals only during those alternate intervals when the light impinging on said photo-electric means is derived from said second source.

7. A photometer as in claim 6 wherein a light integrating member is interposed between said commutating means and said electro-optical means.

8. A photometer as in claim 7 wherein said electro-optical means includes a separate electro-optical unit for each of said color components and means are interposed between said integrating member and said units for passing to each of said units only that color component which corresponds thereto.

References Cited in the file of this patent
UNITED STATES PATENTS

| | | |
|---|---|---|
| 2,467,844 | Michel | Apr. 19, 1949 |
| 2,506,672 | Kell et al. | May 9, 1950 |
| 2,561,243 | Sweet | July 17, 1951 |